Figure 1:
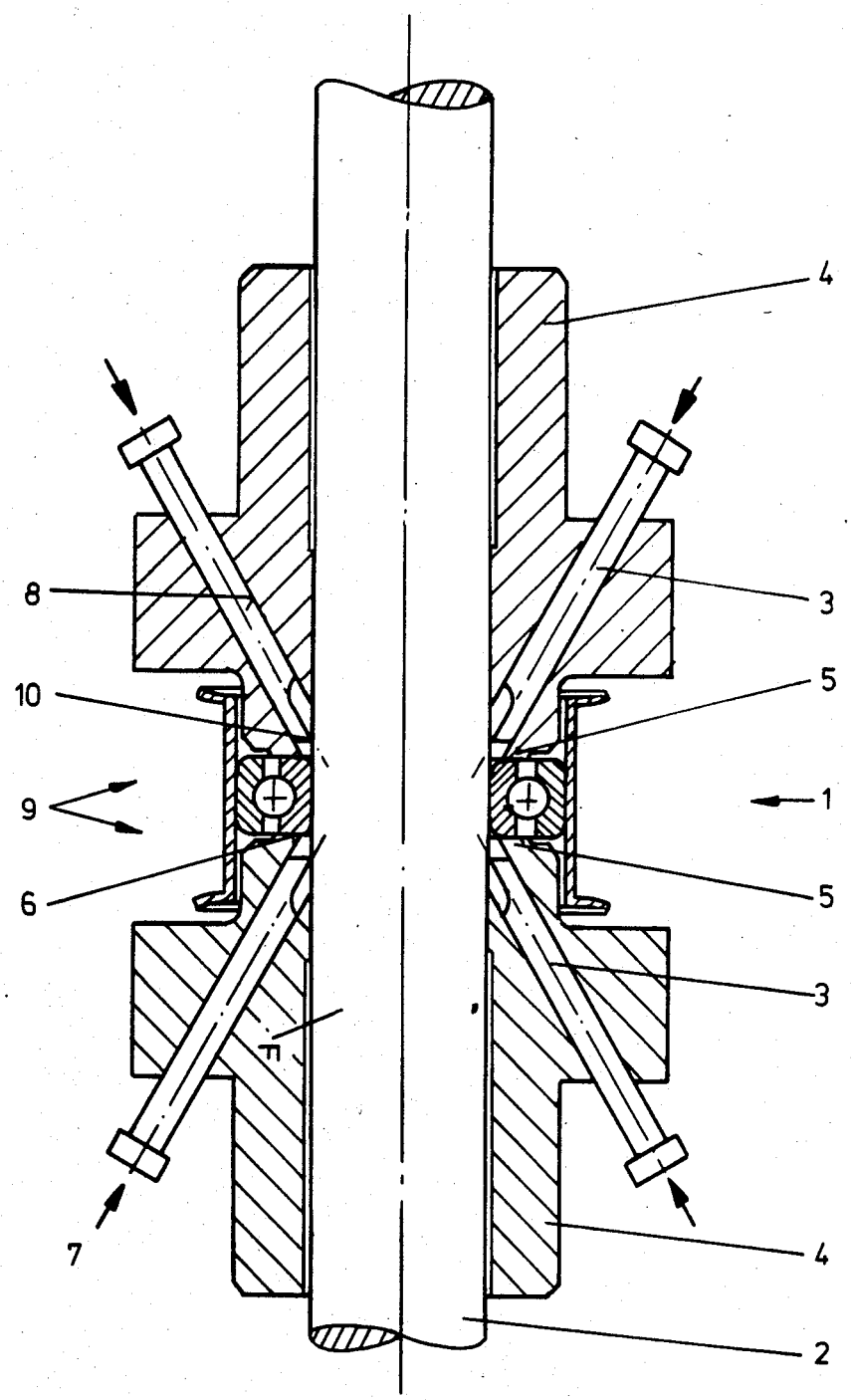

United States Patent [19]
Brandenstein et al.

[11] Patent Number: 4,574,448
[45] Date of Patent: Mar. 11, 1986

[54] APPARATUS FOR FASTENING MACHINE ELEMENT TO A SHAFT

[75] Inventors: Manfred Brandenstein, Eussenheim; Willi Gössmann, Niederwerrn; Gebhard Pape, Schweinfurt; Klaus Huttner, Heidenfeld; Wilfried Ludwig, Sennfeld, all of Fed. Rep. of Germany

[73] Assignee: SKF Kugellagerfabriken GmbH, Schweinfurt, Fed. Rep. of Germany

[21] Appl. No.: 629,430

[22] Filed: Jul. 10, 1984

[30] Foreign Application Priority Data

Jul. 22, 1983 [DE] Fed. Rep. of Germany ....... 3326491

[51] Int. Cl.$^4$ .......................... B23Q 1/00; B23Q 3/00; B23Q 7/04
[52] U.S. Cl. ..................... 29/283.5; 29/509; 29/522 R; 72/402
[58] Field of Search .................. 29/724, 283.5, 522 R, 29/509, 516; 72/124, 399, 402

[56] References Cited

U.S. PATENT DOCUMENTS

| | | | |
|---|---|---|---|
| 1,695,017 | 12/1928 | Kuckuck | 29/522 R UX |
| 2,958,758 | 11/1960 | Snell | 29/522 R X |
| 3,147,832 | 9/1964 | Saro | 29/522 R X |
| 3,344,370 | 9/1967 | Sewell | 29/516 UX |
| 3,425,115 | 2/1969 | Handwerk et al. | 29/516 X |
| 3,453,831 | 7/1969 | Rusche | 29/516 X |
| 3,765,079 | 10/1973 | Pfefferle et al. | 72/402 X |
| 4,428,105 | 1/1984 | Abbott et al. | 29/283.5 X |
| 4,462,148 | 7/1984 | Joyce | 29/522 R X |

Primary Examiner—Charlie T. Moon
Attorney, Agent, or Firm—Yuter, Rosen & Dainow

[57] ABSTRACT

In a method for fixedly mounting a machine element such as a bearing on a smooth shaft, the material of the shaft is displaced by forcing a stamping tool into an outer surface of the shaft, in a direction at an angle to the axis of the shaft.

1 Claim, 2 Drawing Figures

APPARATUS FOR FASTENING MACHINE ELEMENT TO A SHAFT

This invention relates to a method and apparatus for affixing a machine element to a shaft or the like.

DE-OS. No. 2220657 discloses an arrangement enabling the affixing of a machine element to a shaft. In this arrangement a disk shaped machine element is affixed to a hub. The hub has a larger diameter shoulder region on which the machine element is first pushed and then held coaxially therewith by the use of a positioning device. Then stamping tools, axially guided in the positioning device and moveable toward one another, are driven against the shoulder region. The heads of the stamping tools have cutting profiles, so that material from both sides of the shoulder region of the hub is radially displaced and forced against the respective facing surface of the machine element. As a consequence the machine element is axially tightly held on the hub.

The above arrangement has a particular disadvantage in that the hub either must have a shoulder region or must be relatively short so that the material can be pushed therefrom against the machine element. In this arrangement the affixing of a machine element to an elongated smooth cylindrical shaft is not possible, since in this case there is no radially directed working surface for the stamping tools.

The invention is therefore directed to the provision of a method and apparatus for affixing a machine element, wherein it is possible to affix the machine element to the desired position of elongated smooth cylindrical shafts, axles or the like.

In accordance with the invention this object is achieved by forming the material under consideration in the shaft to have substantially V-shaped recesses by forcing stamping tools into the shaft at an angle to the central axis of the shaft. In the arrangement in accordance with the invention each work tool half is comprised of at least one diametrically opposite pair of stamping tools, the stamping tools being displaceably guided in a direction at an angle to the central axis of the arrangement, for example the shaft.

In accordance with the invention the machine element to be fastened to the shaft is first pushed onto the shaft and held by a positioning device. Then the stamping tools, arranged at an angle to the outer surface of the shaft, at corresponding distances to the facing surface of a machine part, are moved against the shaft. The deforming heads of the stamping tools thereby pierce the material of the shaft angularly, for example at an angle of 45° to the axis and to the radius of the shaft. The deforming heads have cutting profiles that act to raise up the material of the shaft in the radial direction and also to displace the material in the axial direction against the end surface of the machine part. This results in a tight fit of the machine element and consequently the axial holding of the machine element on the shaft.

The apparatus in accordance with the invention is comprised of a pair of work tools arranged on the opposite sides of the machine element, each of the work tools having diametrically opposed stamping tools. Upon the simultaneous movement of these four work tools it can be achieved that there are no forces acting to move the machine element from its position on the shaft, so that the machine element may be held by the use of a relatively simple positioning device. As a result of the angularly positioned and angularly piercing stamping tools it is advantageously possible to affix machine elements at the desired positions of long smooth cylindrical shafts, axes, sleeves, tubes or the like. Neither shoulder regions, grooves nor facing sides are required in the method in accordance with the invention. As a consequence the method and apparatus in accordance with the invention are nearly universally useable and provide a dependable and secure axial mounting.

In accordance with a further feature of the invention, the stamping tools are additionally moved in the axial direction. For special cases the mounting can first be comprised of the above described mounting method, followed by the displacement of the work tool halves axially toward one another and thereby providing a further strengthening against the facing surfaces of the machine element.

Figure 2:
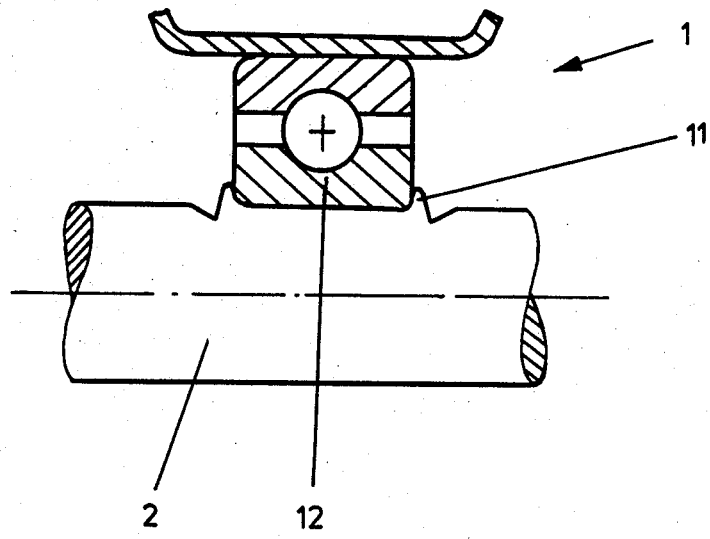

In order that the invention will be more clearly understood, it will now be disclosed in greater detail with reference to the accompanying drawings, wherein:

FIG. 1 is a longitudinal section of the arrangement in accordance with the invention during the affixing of a ball bearing to a shaft; and FIG. 2 is an enlarged partial longitudinal section of the ball bearing of FIG. 1, affixed to the shaft.

FIGS. 1 and 2 illustrate the fastening of a ball bearing 1 on a smooth cylindrical shaft 2 by the use of angularly arranged stamping tools 3. The arrangement consists essentially of two work tool holders 4, the work tool holders 4 being arranged on opposite sides of the ball bearing 1. The work tool holders each have an annular axially extending section 5 for positioning the bearing on the shaft 2, the sections 5 thereby abutting the opposite end faces 6 of the ball bearing. Each of the work tool holders 4 has a recess 7 extending axially thereto for receiving the shaft 2. Each of the work tool holder 4 also has a pair of stamping tools 3 inclined to the outer surface of the shaft 2, i.e. extending at an acute angle to the axis of the shaft. The stamping tools 3 are movably guided in corresponding holes 8 in the holders 4, the stamping tools 3 being adapted to be simultaneously moved by a suitable conventional arrangement (not illustrated). Each stamping tool 3 is provided with a correspondingly shaped cutting head 9.

When a force is applied to the stamping tools 3 in the direction indicated by the arrows in FIG. 1, the cutting edges 10 of the cutting head 9 pierce the material of the shaft 2 at an angle to its outer surface. As a consequence, the material 11 of the shaft (FIG. 2) is so deformed, i.e., forming projections extending radially from the outer surface of the shaft, that the material is pushed axially against the end faces 6 of the inner ring 12 of the bearing. Thereby, as illustrated in FIG. 2, the ball bearing 1 is tightly axially held on the shaft 2. Since the displaced material 11 is also forced against the bore surface of the inner ring, the method for affixing the bearing to the shaft in accordance with the invention additionally holds the bearing positively from turning with respect to the shaft 2.

The illustrated and described embodiment of the invention constitutes one example of the invention. It is apparent that instead of a single pair of stamping tools in each work holder, several pairs of diametrically arranged stamping tools may alternatively be provided in each of the work tool holders. In addition, the method in accordance with the invention hence may also be employed when only one work tool holder is provided if, for example, the machine element to be mounted already abuts another surface, for example, the flange of a further machine element.

What is claimed is:

1. An apparatus for affixing a machine element to a shaft comprising two axially moveable substantially annular work tool holders mountable on the shaft on both sides of the machine element, each work tool holder having at least one diametrically opposite pair of displaceable stamping tools and means for guiding the respective stamping tools for movement in a direction at an angle to the central axis of the apparatus or shaft.

* * * * *